United States Patent
Tsai (10) Patent No.: US 8,064,932 B2
(45) Date of Patent: Nov. 22, 2011

(54) METHODS FOR SCHEDULING A RECEIVING PROCESS AND COMMUNICATION APPARATUSES UTILIZING THE SAME

(75) Inventor: Jeng-Yi Tsai, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 472 days.

(21) Appl. No.: 12/328,829

(22) Filed: Dec. 5, 2008

(65) Prior Publication Data

US 2009/0258661 A1  Oct. 15, 2009

Related U.S. Application Data

(60) Provisional application No. 61/044,094, filed on Apr. 11, 2008.

(51) Int. Cl.
*H04W 88/02* (2009.01)
(52) U.S. Cl. ...................................................... 455/458
(58) Field of Classification Search .................. 455/588, 455/458; 235/486; 370/336, 3.38
See application file for complete search history.

(56) References Cited

U.S. PATENT DOCUMENTS

| 2005/0277429 | A1 | 12/2005 | Laroia et al. | |
| 2006/0285485 | A1 | 12/2006 | Agrawal et al. | |
| 2010/0090000 | A1 * | 4/2010 | Varone et al. | 235/382 |
| 2010/0213262 | A1 * | 8/2010 | Hoeksel et al. | 235/486 |

FOREIGN PATENT DOCUMENTS

EP  0796025 A2  9/1997

* cited by examiner

*Primary Examiner* — Diane Mizrahi
(74) *Attorney, Agent, or Firm* — Thomas|Kayden (57) ABSTRACT

A communication apparatus is provided. A radio transceiver module receives paging indicators according to a first activation signal. A baseband processing module receives the paging indicators from the radio transceiver module and processes the paging indicators according to a second activation signal. A controller obtains corresponding system frame numbers of periodic radio frames, obtains a corresponding paging indicator position in each periodic radio frame, obtains a first and a second wake up time interval distributed within each periodic radio frame according to the corresponding paging indicator position, generates the first and the second activation signal to respectively activate the radio transceiver module and the baseband processing module during the first and the second wake up time interval, wherein both a length of the first wake up time interval and a length of the second wake up time interval are smaller than a length of a periodic radio frame.

21 Claims, 8 Drawing Sheets

METHODS FOR SCHEDULING A RECEIVING PROCESS AND COMMUNICATION APPARATUSES UTILIZING THE SAME

CROSS REFERENCE TO RELATED APPLICATIONS

This application claims the benefit of U.S. Provisional Application No. 61/044,094 filed Apr. 11, 2008, and entitled "PI Detection Method for W-CDMA Downlink Receiver", the entire contents of which are hereby incorporated by reference.

BACKGROUND OF THE INVENTION

1. Field of the Invention

The invention relates to a method for scheduling a receiving process in a communication apparatus, and more particularly to a method for scheduling a receiving process with reduced power consumption.

2. Description of the Related Art

The International Telecommunication Union (ITU) is an international organization found in 1865, whose main tasks include standard setting, allocation of the radio spectrum, and organizing interconnection arrangements between different countries. The International Mobile Telecommunications-2000, IMT-2000 is a global standard defined by the ITU for third generation (3G) wireless communications. 3G technologies enable network operators to offer users a wider range of advanced services while achieving greater network capacity through improved spectral efficiency. Services include wide-area wireless voice telephony, video calls, and transmittance of broadband wireless data, all within a mobile environment. Additional features also include high speed packet access (HSPA) data transmission capabilities able to deliver speeds up to 14.4 Mbit/s for downlinks and 5.8 Mbit/s for uplinks.

The IMT-2000 consists of six radio interfaces: IMT-DS Direct-Sequence, also known as wideband code division multiple access (W-CDMA), IMT-MC Multi-Carrier, also known as CDMA2000, IMT-TD Time Division, such as time division-code division multiple access (TD-CDMA) and time division-synchronous code division multiple access (TD-SCDMA), IMT-SC Single Carrier, also known as EDGE, IMT-FT Frequency Time, also known as digital enhanced cordless telecommunications (DECT), and recently approved IP-OFDMA TDD WAN, which is a specific variant of IEEE 802.16 with specific worldwide interoperability for microwave access (WiMAX) profiles.

For example, the UMTS (Universal Mobile Telecommunications System) is a third-generation (3G) mobile communications system which provides an enhanced range of multimedia services. The mobile communication system can be divided into two segments: a radio access network (RAN) that performs air-interface related functions and a core network (CN) that performs switching functions and interfaces to external networks such as the Internet or a public-switched telephone network. The third-generation mobile communication system provides improvements in both the radio access network RAN and the core network CN. Currently, the most common form of UMTS uses W-CDMA (Wideband Code Division Multiple Access) as the underlying air interface and is standardized by the 3rd Generation Partnership Project (3GPP). The CDMA2000 is a hybrid 2.5G/3G technology of mobile telecommunications standards that use CDMA, a multiple access scheme for digital radio, to send voice, data, and signalling data (such as a dialed telephone number) between mobile phones and cell sites.

BRIEF SUMMARY OF THE INVENTION

Communication apparatuses and methods for scheduling a receiving process in a communication apparatus are provided. An embodiment of such a communication apparatus comprises a subscriber identity card, a radio transceiver module, a baseband processing module, and a controller. The radio transceiver module receives a paging period parameter and a paging indicator parameter of the subscriber identity card from a wireless network, and receives node-B signals comprising paging indicators from the wireless network according to a first activation signal. The baseband processing module receives the down-converted baseband node-B signals comprising the paging indicators from the radio transceiver module and processes the received paging indicators according to a second activation signal. The controller is coupled to the radio transceiver module, the subscriber identity card and the baseband processing module, obtains corresponding system frame numbers of periodic radio frames according to the paging period parameter, obtains a corresponding paging indicator position for the subscriber identity card in each periodic radio frame according to the paging indicator parameter, an identity number of the subscriber identity card and a system frame number, obtains a first wake up time interval and a second wake up time interval distributed within each periodic radio frame according to the corresponding paging indicator position, generates the first activation signal to activate the radio transceiver module during the first wake up time interval, and generates the second activation signal to activate the baseband processing module during the second wake up time interval, wherein both a length of the first wake up time interval and a length of the second wake up time interval are smaller than a length of each periodic radio frame.

An embodiment of a method for scheduling a receiving process of a communication apparatus in a communication system is provided, wherein the communication apparatus comprises a radio transceiver module, a subscriber identity card communicating with a wireless network via the radio transceiver module, a baseband processing module, and a controller coupled to the radio transceiver module, the subscriber identity card and the baseband processing module for controlling the operations therebetween, and the method comprises: receiving a paging period parameter and a paging indicator parameter from the wireless network via the radio transceiver module; deactivating the radio transceiver module; obtaining a plurality of corresponding system frame numbers of a plurality of periodic radio frames according to the paging period parameter, wherein the wireless network plans to send a plurality of the paging indicators in a paging indicator message in each periodic radio frame; dynamically obtaining a first wake up time interval distributed within each periodic radio frame according to the paging indicator parameter, an identity number of the subscriber identity card and a system frame number of the communication apparatus, wherein a length of the first wake up time interval is smaller than a length of each periodic radio frame; and activating the radio transceiver module to receive a portion of the paging indicators during the first wake up time interval.

Another embodiment of a method for scheduling a receiving process of a communication apparatus in a communication system is provided, wherein the communication apparatus comprises a radio transceiver module, a subscriber identity card communicating with a wireless network via the radio transceiver module, a baseband processing module, and a controller coupled to the radio transceiver module, the subscriber identity card and the baseband processing module for controlling the operations therebetween, and the method comprises: receiving a paging period parameter and a paging indicator parameter from the wireless network via the radio transceiver module; deactivating the radio transceiver module; obtaining a plurality of corresponding system frame numbers of a plurality of periodic radio frames according to the paging period parameter, wherein the wireless network plans to send a plurality of paging indicators in a paging indicator message in each periodic radio frame; dynamically obtaining a corresponding paging indicator position in each periodic radio frame according to the paging indicator parameter, an identity number of the subscriber identity card and a system frame number of the communication apparatus; obtaining a first wake up time interval distributed within the periodic radio frame according to the corresponding paging indicator position; and activating the radio transceiver module to receive a portion of the paging indicators and activating a baseband processing module to process the received paging indicators during the first wake up time interval when the corresponding paging indicator position is distributed posterior to a predetermined threshold position in the periodic radio frame, wherein a length of the first wake up time interval is smaller than a length of the periodic radio frame.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
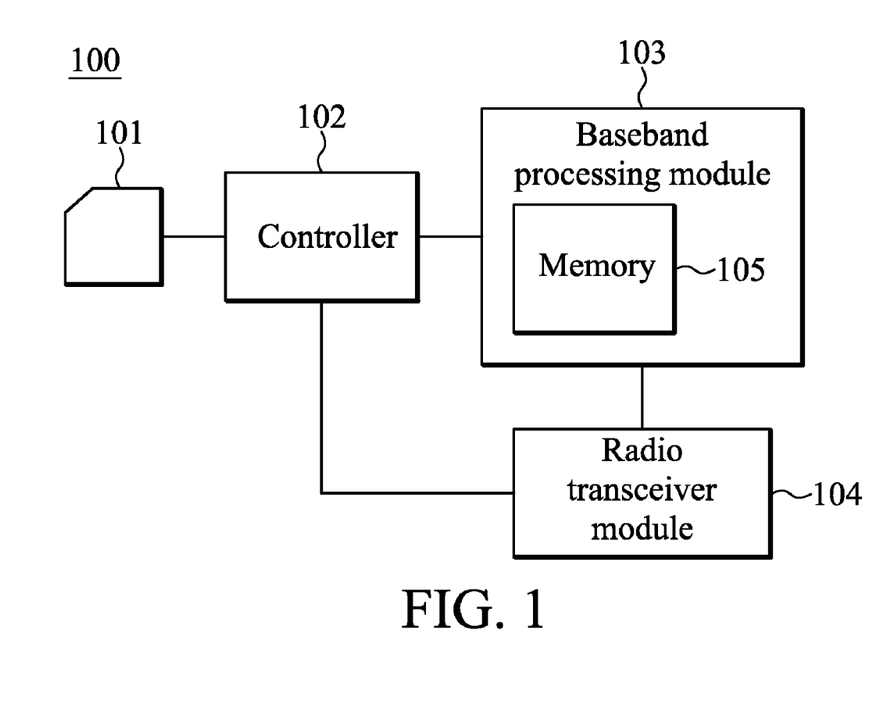
FIG. 1 shows a communication apparatus capable of scheduling a receiving process with reduced power consumption according to an embodiment of the invention.
Figure 2:
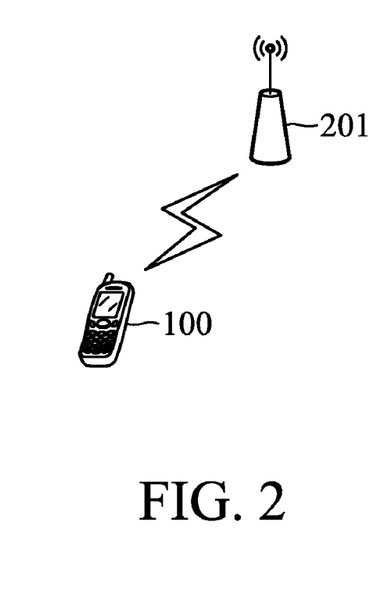
FIG. 2 shows an exemplary network topology according to an embodiment of the invention.

FIG. 1 shows a communication apparatus capable of scheduling a receiving process with reduced power consumption according to an embodiment of the invention. As shown in FIG. 1, communication apparatus 100 comprises a subscriber identity card 101, a controller 102, a baseband processing module 103, and a radio transceiver module 104, wherein the controller 102 is coupled to the radio transceiver module 104, the subscriber identity card 101 and the baseband processing module 103 for controlling the operations thereof. FIG. 2 shows an exemplary network topology according to an embodiment of the invention. The communication apparatus 100 may communicate with a wireless network through a cell belonging to the wireless network, and camps on the cell via the radio transceiver module 104, where the cell may be covered by a Node B (or also known as a base station in Global System for Mobile communications, GSM) 201 shown in FIG. 2. The radio transceiver module 104 receives radio frequency wireless signals from the cell of the wireless network, converts the received signals to baseband signals to be processed by the baseband processing module 103, or receives baseband signals from the baseband processing module 103 and converts the baseband signals to radio frequency wireless signals to be transmitted to a peer device. The radio transceiver module 104 may comprise a plurality of hardware devices to perform radio frequency conversion. For example, the radio transceiver module 104 may comprises a mixer to multiply the baseband signals with a carrier oscillated in the radio frequency of the wireless communication system for transmission, wherein the radio frequency may be, for example, 1900 MHz for W-CDMA. When the radio transceiver module 104 receives radio frequency wireless signals, the mixer recovers the received signal into baseband signals, and the baseband processing module 103 converts the baseband signals to a plurality of digital signals and processes the digital signals. The baseband processing module 103 may also comprise a plurality of hardware devices to perform baseband signal processing. The baseband signal processing may comprise analog to digital conversion (ADC)/digital to analog conversion (DAC), gain adjusting, modulation/demodulation, encoding/decoding, and so on. The subscriber identity card 101 may record a plurality of user information and the controller 102 may read data from the plugged subscriber identity card 101 and write data to the plugged subscriber identity card 101.

According to an embodiment of the invention, the subscriber identity card 101 may relate to one kind of wireless communication system. For example, the subscriber identity card 101 may be a universal subscriber identity module (USIM) card of a Universal Mobile Telecommunications System (UMTS), or a removable user identity module (RUIM) card or a CDMA Subscriber Identity Module (CSIM) card of a CDMA2000 system, or others. For example, the USIM card stores user account information, international mobile subscriber identity (IMSI), authentication information and a set of USIM Application Toolkit (USAT) commands and provides storage space for text messages and phone book contacts. The controller 102 may interact with a MCU of the USIM card to fetch data or SAT commands from the plugged USIM card.

In the communication systems such as the GSM, UMTS, General Packet Radio Service (GPRS), CDMA 2000 or Time Division-Synchronous Code Division Multiple Access (TD-SCDMA) communication system, the communication apparatus, also known as mobile station (MS) or user equipment (UE), may use discontinuous reception (DRX) in the idle mode to reduce power consumption after camping on a cell. When DRX is used, the base stations or Node Bs (e.g. 201 of FIG. 2) transmit paging indicator messages to each particular user periodically at the paging occasions and thus, the communication apparatus 100 is required to receive the paging indicator messages carried in the paging indicator channel (PICH) burst at the corresponding radio frames of the paging occasions. The PICH is a common, time-shared indication channel used to inform communication apparatus 100 whether the communication apparatus 100 needs to receive the following paging channel (PCH) channel. The PICH is always broadcasting and the communication apparatus 100 receives the paging indicator message every 0.08 s, 0.16 s, 0.32 s, 0.64 s, 1.28 s, 2.56 s, or 5.12 s depending on the DRX cycle length configured to the communication apparatus 100. Once per DRX cycle, each MS wakes up at the frame corresponding to its paging occasion and monitors the paging indicator of interest that is transmitted over the PICH. For example, for a W-CDMA interface, the paging indicator messages is carried in the paging indicator channel (PICH) burst, and the length of a PICH radio frame is 10 milliseconds and there are 15 slots or 150 symbols in a PICH radio frame. The paging occasion defines the time for the communication apparatus to wake up and receive the paging indicator messages. Before obtaining the radio frame positions (system frame numbers) of the paging occasions, the communication apparatus 100 may first collect some parameters for defining the behavior of the discontinuous reception from the system information carried in a Broadcast Control Channel (BCCH) burst. For example, a paging indicator parameter Np and DRX cycle length coefficient k (paging period parameter) in a W-CDMA system. The paging indicator parameter Np defines an amount of the paging indicators carried in one paging indicator message. The possible setting for the Np for W-CDMA may be 144, 72, 36 or 18. A smaller Np means that there are more symbols which can be used for a paging indicator for a dedicated user in one paging indicator message, for example, 8 symbols in each paging indicator when Np=18 while only 1 symbol in each paging indicator when Np=144. Further, the DRX cycle length for W-CDMA is determined by $$\text{MAX}(2^k, \text{PBP}) \text{frames} \qquad \text{Eq. 1,}$$

where k is an integer and PBP is the paging block periodicity.

Figure 3:
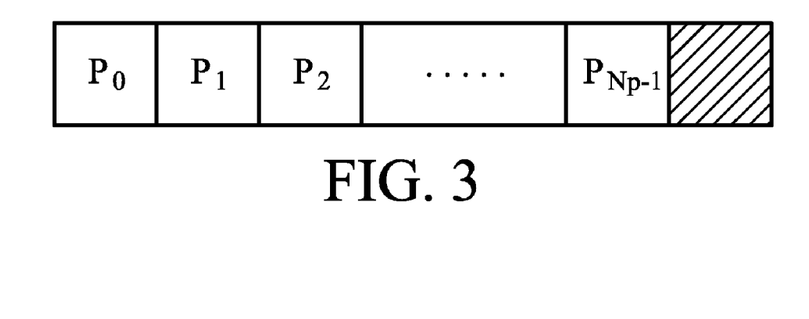
FIG. 3 shows an exemplary PICH burst.
Figure 4:
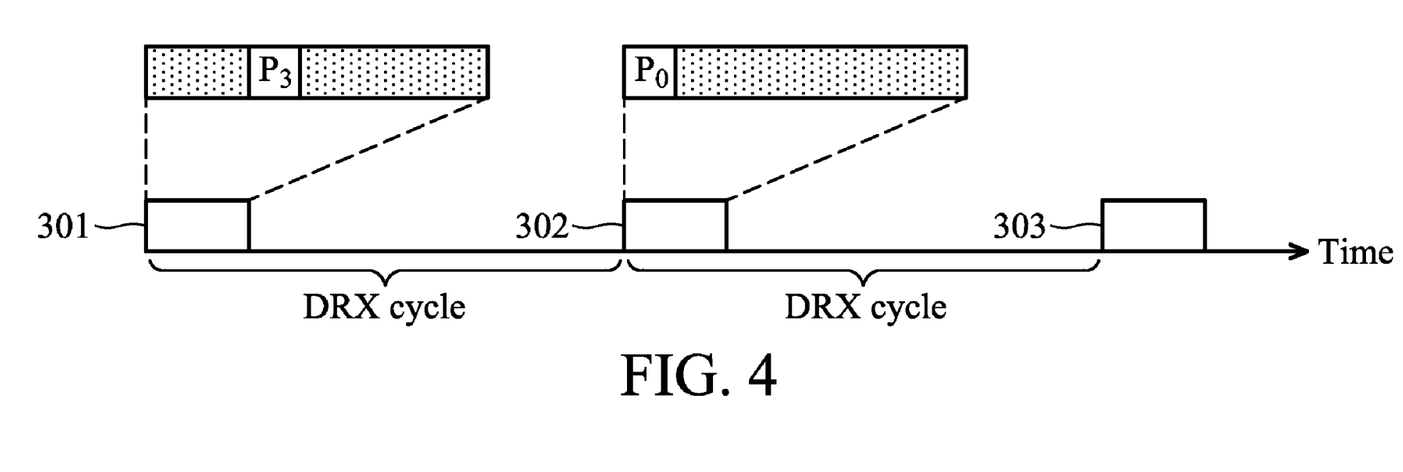
FIG. 4 shows an exemplary distribution of paging occasions along a time axis.

FIG. 3 shows an exemplary PICH burst. As shown in FIG. 3, the PICH burst carries Np paging indicators, labeled by $P_0, P_1, \ldots, P_{Np-1}$, in one radio frame, wherein the shaded block represents the period when no paging indicator is being sent, and length of the period is typically equal to 6 symbols. FIG. 4 shows an exemplary distribution of paging occasions along a time axis. As shown in FIG. 4, during a DRX cycle, the communication apparatus 100 only wakes up at the radio frames of paging occasions 301~303 to receive the paging indicator messages and enters sleeping mode for power saving at the remaining DRX cycle. Among the Np paging indicators in a paging indicator message, there is one paging indicator $P_q$ associated with the communication apparatus 100, wherein the number q may be calculated according to the IMSI of the subscriber identity card 101, the paging indicator parameter Np, and the system frame number (SFN). The system frame number is a time varying integer that has been synchronized with the wireless network and is maintained by the controller 102 to represent a current processing frame number. The system frame number may be obtained from a free run counter bounded between 1 and a predetermined value, wherein the counter will be reset when the counting number reaches the predetermined value. Thus, at each paging occasion, the position of the paging indicator $P_q$ may vary with time. For example, when the SFN of the radio frame at paging occasion 301 is x, the position of the paging indicator for communication apparatus 100 may be $P_3$ as shown in FIG. 4. When the SFN of the radio frame at paging occasion 302 is (x+256), wherein 256 is the DRX cycle length, the location of the paging indicator for communication apparatus 100 changes to $P_0$. After receiving the paging indicator message, the communication apparatus 100 decides whether to sleep again by checking the associated page indicator $P_q$. If the paging indicator reveals that the communication apparatus 100 is now being paged, the communication apparatus 100 may initiate a process for receiving a following paging message, such as the paging message carried in the paging channel (PCH) of a W-CDMA system. Otherwise, the communication apparatus 100 decides to sleep again and will wake up at its next paging occasion.

Figure 5:
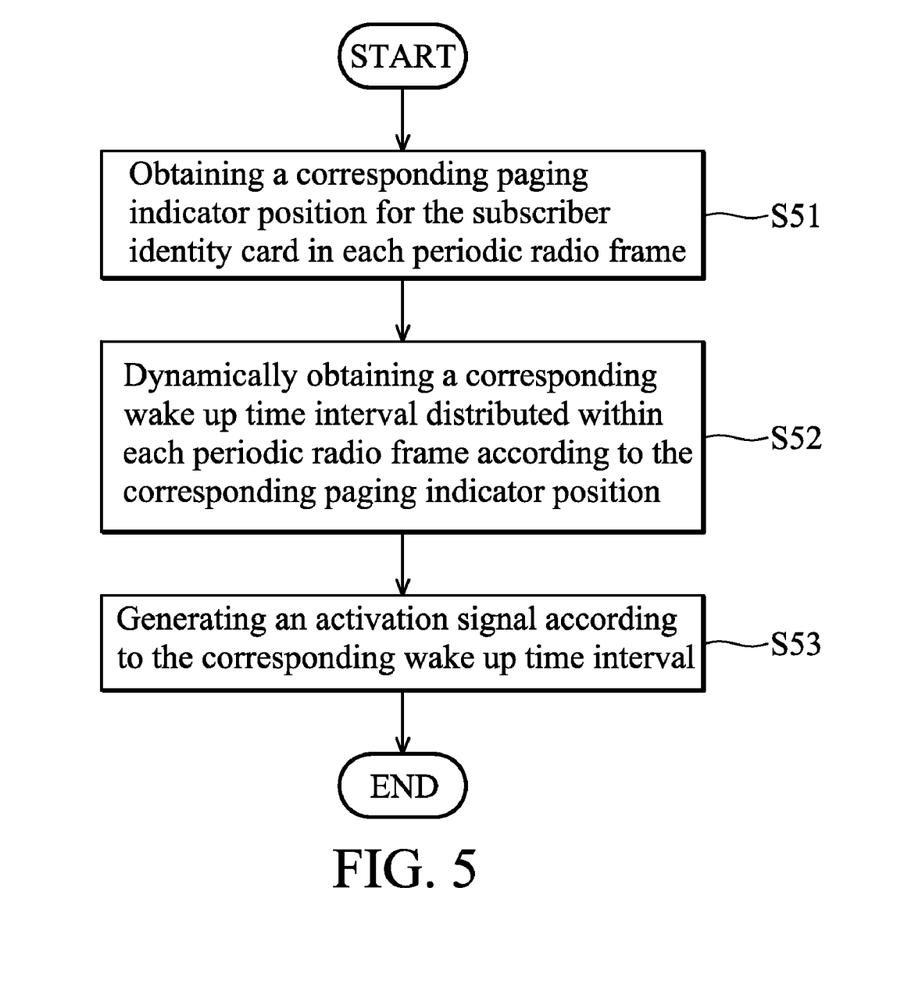
FIG. 5 shows a flow chart of the method for scheduling a receiving process in the communication apparatus according to an embodiment of the invention.
Figure 6:
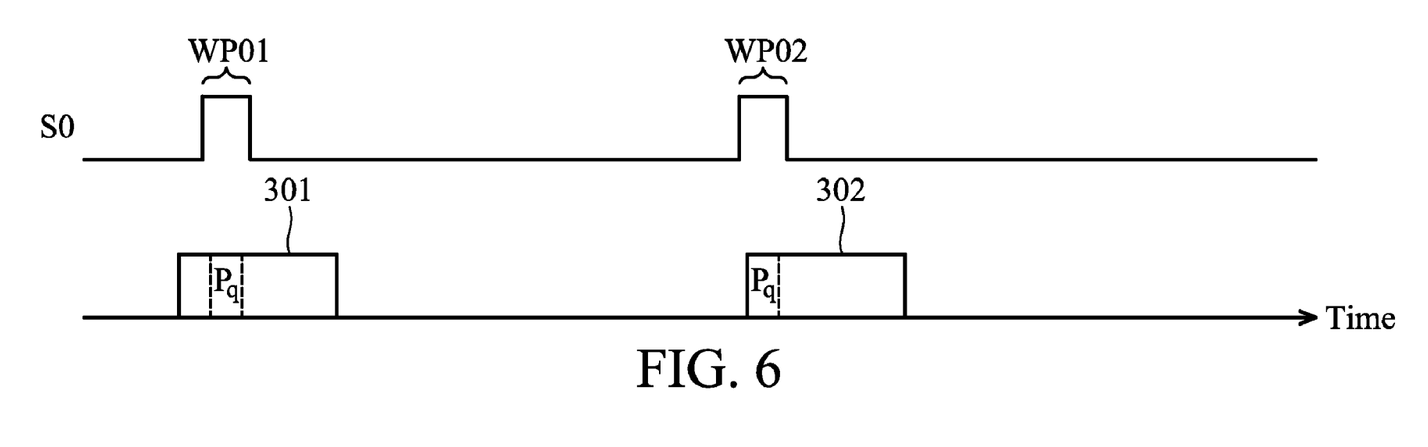
FIG. 6 shows an exemplary wake up time interval with respect to the corresponding paging indicator position in each period radio frames of paging occasions according to an embodiment of the invention.

As described above, the communication apparatus 100 may sleep when entering the idle mode by deactivating parts of the hardware devices and software to reduce power consumption. For example, the baseband processing module 103 and radio transceiver module 104 may be deactivated when entering idle mode and using discontinuous reception for power saving. According to an embodiment of the invention, the controller 102 may obtain the corresponding paging indicator position q for the subscriber identity card 101 in advance so as to activate the baseband processing module 103 and radio transceiver module 104 during a wake up time period that is shorter than the time period of a radio frame to further reduce power consumption. FIG. 5 shows a flow chart of the method for scheduling a receiving process in the communication apparatus according to an embodiment of the invention. After obtaining corresponding system frame numbers of periodic radio frames of the paging occasions, such as the paging occasions 301~302 shown in FIG. 4, the controller 102 obtains a corresponding paging indicator position (e.g. the number q for paging indicator $P_q$ as previously described) for the subscriber identity card in each periodic radio frame (Step S51). Next, the controller 102 dynamically obtains a corresponding wake up time interval distributed within each periodic radio frame according to the corresponding paging indicator position (Step S52). Finally, the controller 102 generates an activation signal according to the corresponding wake up time interval so as to activate the radio transceiver module 104 and the baseband processing module 103 during the corresponding wake up time interval (Step S53). FIG. 6 shows an exemplary activation signal S0 and wake up time interval with respect to the corresponding paging indicator position in each period radio frames of paging occasions according to an embodiment of the invention. In this embodiment, an active-high activation signal S0 is pulled high at paging occasions 301 and 302 for the wake up time interval WP01 and WP02, respectively. It is to be noted that the activation signal S0 may also be an active-low signal and the invention should not be limited thereto. The controller 102 controls the lengths of the wake up time interval of the radio transceiver module 104 and the baseband processing module 103 to be shorter than a length of each periodic radio frame. The radio transceiver module 104 is activated during the corresponding wake up time interval in each periodic radio frame according to the activation signal S0 to receive node-B signals comprising a portion of the paging indicators in the paging indicator messages. The baseband processing module 103 is activated during the corresponding wake up time interval in each periodic radio frame according to the activation signal S0 to receive baseband node-B signals, comprising paging indicators, from the radio transceiver module 104, obtain a channel estimation result according to the received baseband node-B signals, process the received node-B signals with corresponding paging indicator position q of the subscriber identity card 101 according to the channel estimation result to obtain a paging indication result, and determine whether to inform the controller 102 to generate another activation signal to activate the radio transceiver module to receive a following paging message from node-B according to the paging indication result.

Figure 7:
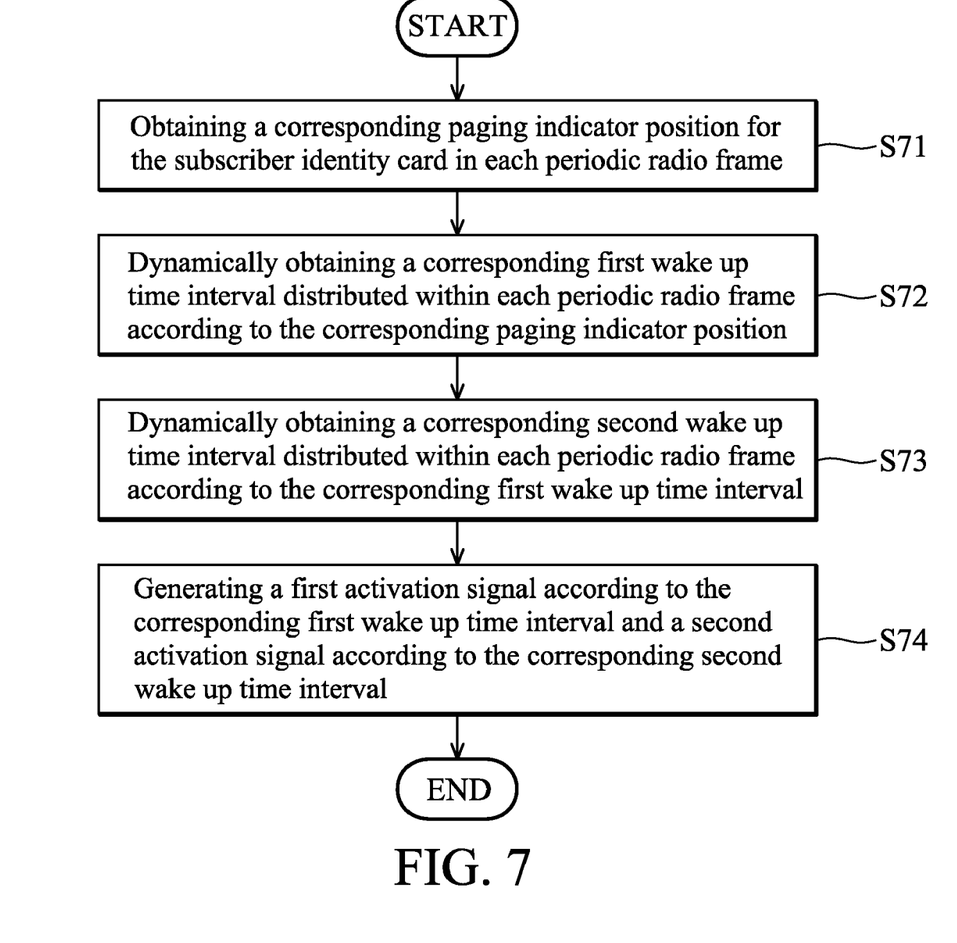
FIG. 7 shows a flow chart of the method for scheduling a receiving process in the communication apparatus according to another embodiment of the invention.
Figure 8:
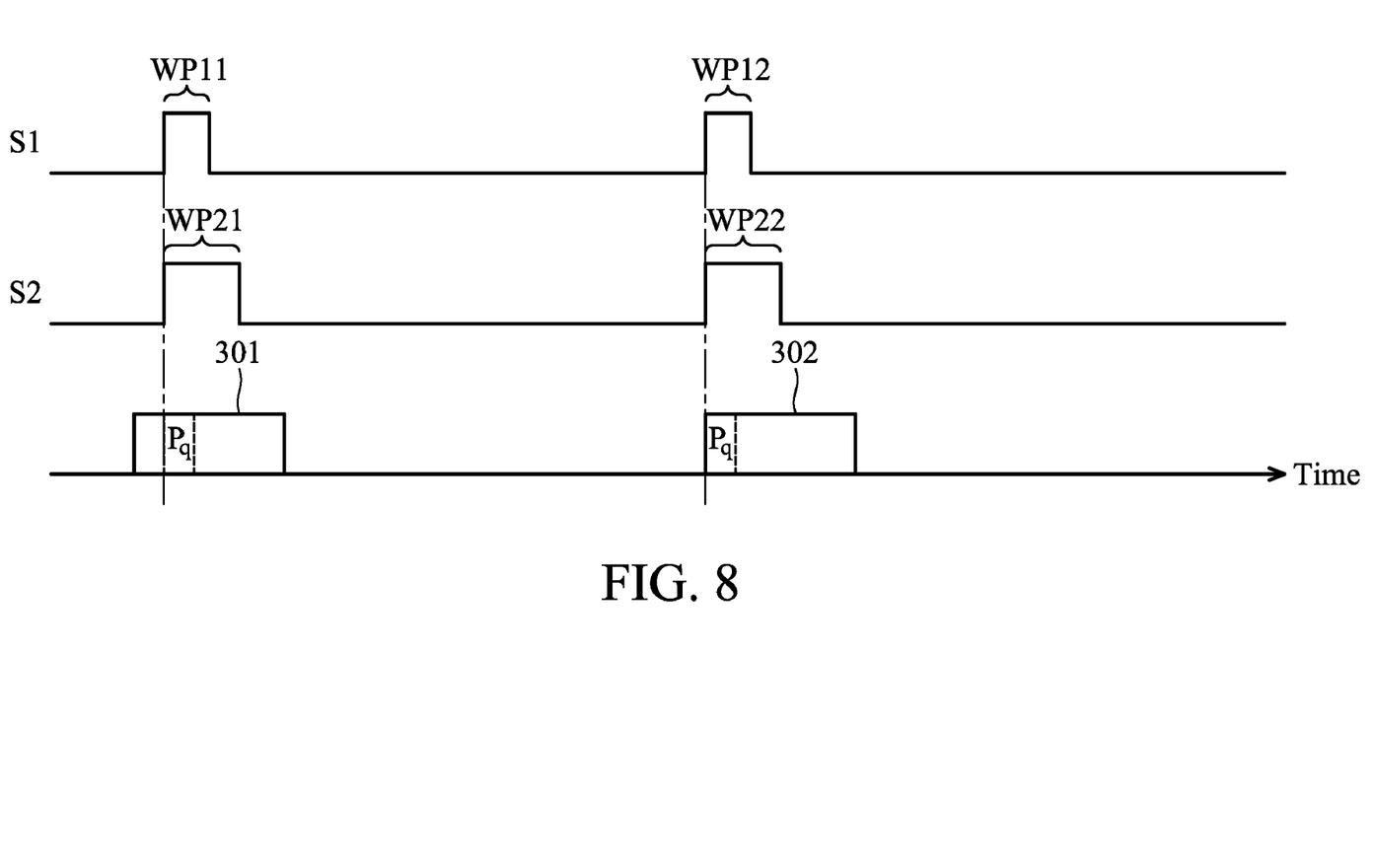
FIG. 8 shows exemplary activation signals the corresponding wake up time intervals with respect to the corresponding paging indicator position in each period radio frames of paging occasions according to the embodiment of the invention.

In some other embodiments, the wake up time intervals of the baseband processing module 103 and radio transceiver module 104 are different, for example, the radio transceiver module 104 may switch to idle mode first, leaving the baseband processing module 103 activated for a while, then the baseband processing module 103 returns to idle mode after completing baseband processing. FIG. 7 shows a flow chart of the method for scheduling a receiving process in the communication apparatus according to another embodiment of the invention. After obtaining corresponding system frame numbers of periodic radio frames of the paging occasions, such as the paging occasions 301~302 shown in FIG. 4, the controller 102 obtains a corresponding paging indicator position (e.g. the number q for paging indicator $P_q$ as previously described) for the subscriber identity card in each periodic radio frame (Step S71). Next, the controller 102 dynamically obtains a first wake up time interval distributed within each periodic radio frame according to the corresponding paging indicator position (Step S72). Next, the controller 102 dynamically obtains a second wake up time interval distributed within each periodic radio frame according to the first wake up time interval (Step S73). Finally, the controller 102 generates a first activation signal according to the first wake up time interval and a second activation signal according to the second wake up time interval so as to activate the radio transceiver module 104 during the first wake up time interval and to activate the baseband processing module 103 during the second wake up time interval (Step S74). FIG. 8 shows exemplary activation signals S1 and S2 the corresponding wake up time intervals with respect to the corresponding paging indicator position in each period radio frames of paging occasions according to the embodiment of the invention. In this embodiment, active-high activation signals S1 and S2 are pulled high at paging occasions 301 and 302 for the wake up time intervals WP11 and WP12, and WP21 and WP22, respectively. It is to be noted that the activation signals S1 and S2 may also be active-low signals and the invention should not be limited thereto. The controller 102 controls the lengths of the wake up time intervals of the radio transceiver module 104 and the baseband processing module 103 to be smaller than a length of each periodic radio frame, and further controls the lengths of the wake up time intervals of the radio transceiver module 104 to be smaller than that of the baseband processing module 103. In this embodiment, the controller 102 activates the radio transceiver module 104 and the baseband processing module 103 at the beginning of the corresponding paging indicator position q in each periodic radio frame via the first and second activation signals, such as S1 and S2 shown in FIG. 8. It is to be noted that the first and second activation signals may be aligned to the corresponding slot or symbol of the paging indicator position q so as to activate the radio transceiver module 104 and the baseband processing module 103 at the beginning of the slot or symbol of corresponding paging indicator position q. The radio transceiver module 104 is activated during the first wake up time interval in each periodic radio frame according to the activation signal S1 to receive all signals from node-B which comprises a portion of the paging indicators in the paging indicator messages and is deactivated after down-converting the node-B signals comprising the paging indicators to the baseband processing module 103. The baseband processing module 103 is activated during the second wake up time interval according to the activation signal S2 to receive baseband node-B signals which comprises the paging indicators from the radio transceiver module 104, store the received baseband node-B signals in a memory device 105, obtain a channel estimation result according to the stored baseband node-B signals, process the stored baseband node-B signals with corresponding paging indicator position q of the subscriber identity card 101 according to the channel estimation result to obtain a paging indication result, and determine whether to inform the controller 102 to generate another activation signal to activate the radio transceiver module 104 to receive a following paging message from node-B according to the paging indication result. It is to be noted that the first wake up time interval may be long enough for the radio transceiver module 104 to receiving necessary data for channel estimation, and the second wake up time interval may be long enough for the baseband processing module 103 to perform channel estimation, and decode the paging indicator for the subscriber identity card 101. It is also possible for the baseband processing module 103 to be activated after a time period of activating the radio transceiver module 104.

Figure 9:
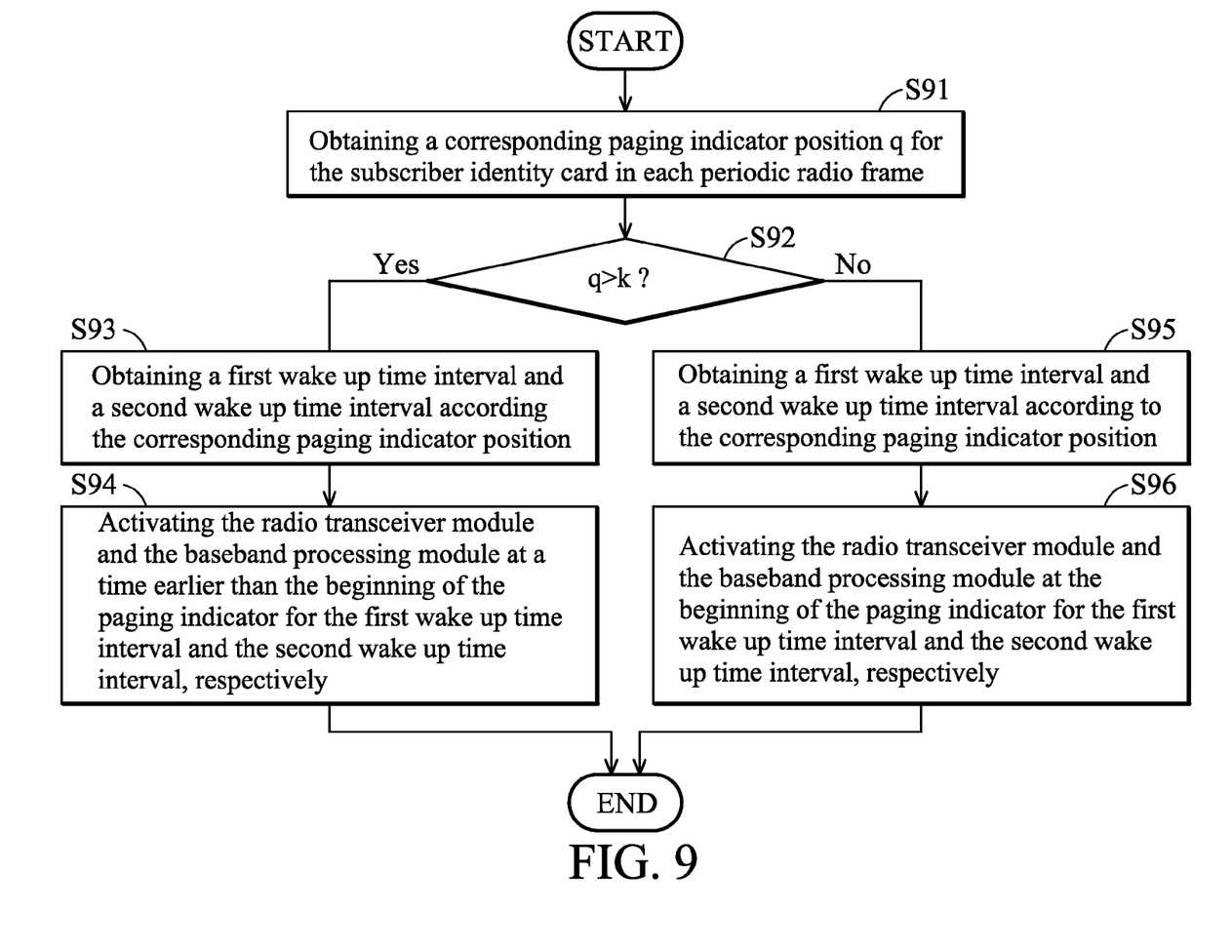
FIG. 9 shows a flow chart of the method for scheduling a receiving process in the communication apparatus according to another embodiment of the invention.

According to another embodiment of the invention, the controller 102 may determine the wake up time intervals for the radio transceiver module 104 and the baseband processing module 103 more flexibly according to the distribution of the corresponding paging indicator position q for the subscriber identity card 101. FIG. 9 shows a flow chart of the method for scheduling a receiving process in the communication apparatus according to another embodiment of the invention. After obtaining corresponding system frame numbers of periodic radio frames of the paging occasions, such as the paging occasions 301~302 shown in FIG. 4, the controller 102 obtains a corresponding paging indicator position (e.g. the number q for paging indicator $P_q$ as previously described) for the subscriber identity card in each periodic radio frame (Step S91). Next, the controller 102 determines whether the corresponding paging indicator position q is distributed posterior to a predetermined threshold position k in the periodic radio frame (Step S92). When q>k, the controller 102 obtains a first wake up time interval and a second wake up time interval according the corresponding paging indicator position q (Step S93) and activates the radio transceiver module 104 and the baseband processing module 103 at a time earlier than the beginning of the paging indicator $P_q$ for the first wake up time interval and the second wake up time interval, respectively (Step S94). For example, the controller may use the activation signal S0 to activate the radio transceiver module 104 and the baseband processing module 103 during the wake up time interval WP01 as shown in FIG. 6. Alternatively, when q<=k, the controller 102 obtains a first wake up time interval and a second wake up time interval according to the corresponding paging indicator position (Step S95), wherein the length of the first wake up time interval is smaller than that of the second wake up time interval. Finally, the controller 102 activates the radio transceiver module 104 and the baseband processing module 103 at the beginning of the paging indicator $P_q$ for the first wake up time interval and the second wake up time interval, respectively (Step S96). For example, the controller may use the activation signals S1 and S2 to activate the radio transceiver module 104 and the baseband processing module 103 during the wake up time interval WP11 and WP21 as respectively shown in FIG. 8. According to an embodiment of the invention, the predetermined threshold position k may be chosen as a position apart from the following paging message with a predetermined time interval long enough for the baseband processing module 103 to process and decode the paging indicator $P_q$. In this embodiment, when q>k, the paging indicator $P_q$ arrives at the end of the radio frame, if the radio transceiver module 104 and the baseband processing module 103 activate at the beginning of the paging indicator $P_q$, these modules may not be able to complete the computations before the arrival of the next PCH. In a variation of the embodiment shown in FIG. 9, the first wake up time interval and the second wake up time interval are the same.

Figure 10:
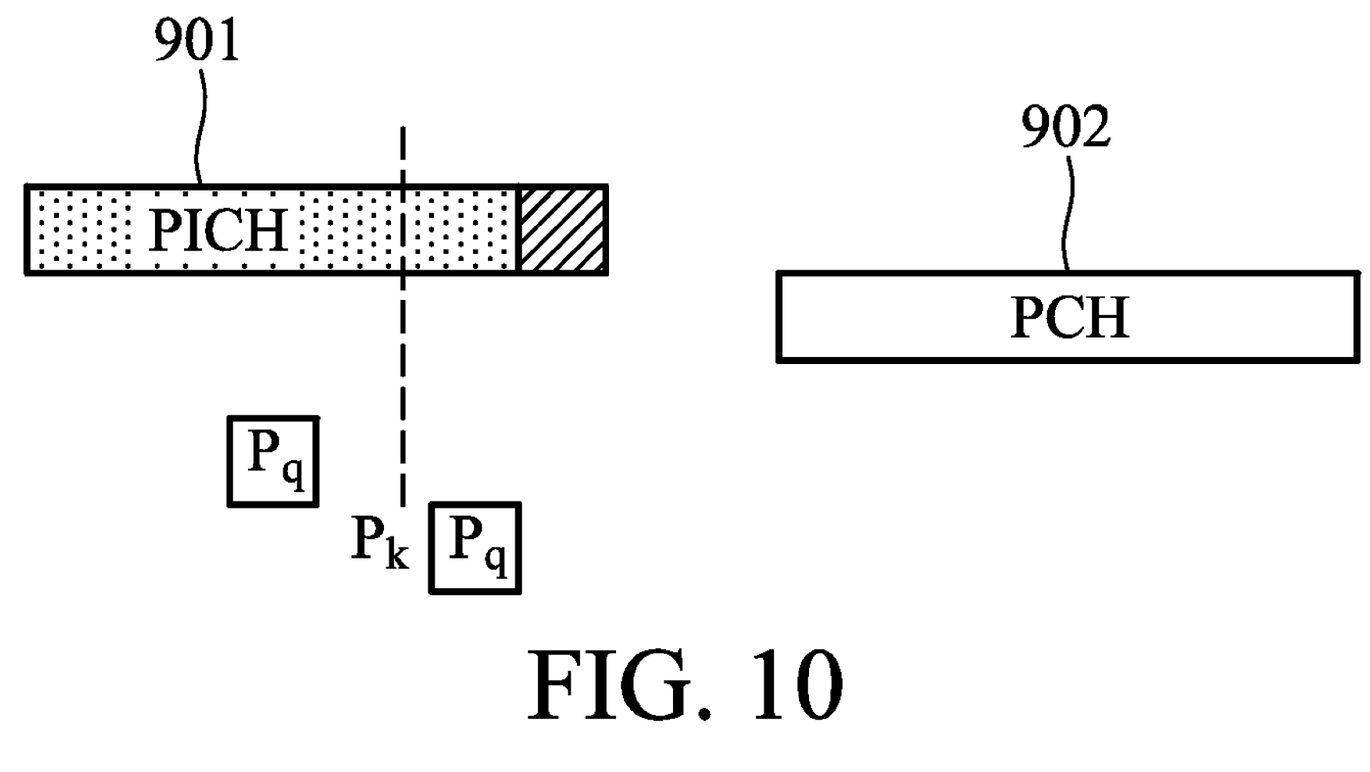
FIG. 10 shows an exemplary PICH burst and an exemplary PCH burst.

FIG. 10 shows an exemplary PICH burst 901 and an exemplary PCH burst 902 for describing the embodiment in detail. According to the embodiment of the invention, when the corresponding paging indicator position q for the subscriber identity card 101 is distributed posterior to a predetermined threshold position k of the paging indicator $P_k$, the controller 102 may activate the radio transceiver module 104 and the baseband processing module 103 earlier than the beginning time of the transmission of the paging indicator $P_q$ for a time period to receive signals from node-B covering longer than interested paging indicator for estimating the channel impulse response in advance. The baseband processing module 103 may, in real-time, process the down-converted baseband node-B signals obtained from the radio transceiver module 104 to obtain the channel estimation result when the radio transceiver module 104 is activated for receiving them. After obtaining the channel estimation result, the baseband processing module 103 may further process and decode the paging indicator $P_q$ according to the channel estimation result. The radio transceiver module 104 and the baseband processing module 103 may be deactivated after obtaining the paging indication result. If the paging indication result reveals that there is a possible transmission to come, the radio transceiver module 104 may be activated again to receive the following PCH 902. Alternatively, when the corresponding paging indicator position q for the subscriber identity card 101 is not distributed posterior to a predetermined threshold position k of the paging indicator $P_k$, the controller 102 may activate the radio transceiver module 104 and the baseband processing module 103 at the beginning of the transmission of the paging indicator $P_q$, such as the beginning of the corresponding slot or symbol of the paging indicator position q. The radio transceiver module 104 may receive node-B signals not only covering paging indicator $P_q$ but long enough for channel estimation and may be deactivated after passing the down-converted base-band node-B signals which comprises paging indicator $P_q$ to the baseband processing module 103. The baseband processing module 103 may store the baseband node-B signals comprising paging indicator $P_q$ obtained from the radio transceiver module 104, and process them after the radio transceiver module 104 is deactivate. After obtaining the channel estimation result according to the stored baseband node-B signals, the baseband processing module 103 may further process and decode the paging indicator $P_q$ according to the channel estimation result to obtain the paging indication result, and may be deactivated after obtaining the paging indication result. If the paging indication result reveals that there is a possible transmission to come, the radio transceiver module 104 may be activated again to receive the following PCH 902.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus capable of receiving data designated to an identity number storing in a subscriber identity card, comprising:
   a radio transceiver module receiving a paging period parameter and a paging indicator parameter of the subscriber identity card from a wireless network, and receiving node-B signals comprising a plurality of paging indicators from the wireless network according to a first activation signal, wherein the radio transceiver module is implemented by a hardware device;
   a baseband processing module receiving baseband node-B signals comprising paging indicators from the radio transceiver module and processing the received baseband node-B signals according to a second activation signal; and
   a controller coupled to the radio transceiver module, the subscriber identity card and the baseband processing module, obtaining a plurality of corresponding system frame numbers of a plurality of periodic radio frames according to the paging period parameter, obtaining a corresponding paging indicator position for the subscriber identity card in each periodic radio frame according to the paging indicator parameter, the identity number and the corresponding system frame number of each periodic radio frame, obtaining a first wake up time interval and a second wake up time interval distributed within each periodic radio frame according to the corresponding paging indicator position, generating the first activation signal to activate the radio transceiver module during the first wake up time interval, and generating the second activation signal to activate the baseband processing module during the second wake up time interval, wherein both a length of the first wake up time interval and a length of the second wake up time interval are smaller than a length of a periodic radio frame.

2. The communication apparatus as claimed in claim 1, wherein the length of the first wake up time interval and the length of the second wake up time interval in one periodic radio frame are the same when the corresponding paging indicator position is distributed posterior to a predetermined threshold position in the periodic radio frame.

3. The communication apparatus as claimed in claim 2, wherein the baseband processing module further obtains a channel estimation result according to the received baseband node-B signals, processes the received paging indicators with corresponding paging indicator position according to the channel estimation result to obtain a paging indication result, and determines whether to inform the controller to generate a third activation signal to activate the radio transceiver module to receive a following paging message according to the paging indication result.

4. The communication apparatus as claimed in claim 1, wherein the controller generates the first activation signal and the second activation signal at the beginning of the corresponding paging indicator position in one periodic radio frame when the corresponding paging indicator position is not distributed posterior to a predetermined threshold position in the periodic radio frame.

5. The communication apparatus as claimed in claim 4, wherein the radio transceiver module is deactivated according to the first activation signal after down-converting the node-B signals comprising the paging indicators to the baseband processing module, and wherein the baseband processing module further stores the received baseband node-B signals comprising the paging indicators in a memory device, obtains a channel estimation result according to the stored baseband node-B signals, processes the stored paging indicators with corresponding paging indicator position according to the channel estimation result to obtain a paging indication result, and determines whether to inform the controller to generate a third activation signal to activate the radio transceiver module to receive a following paging message according to the paging indication result.

6. The communication apparatus as claimed in claim 4, wherein the length of the first wake up time interval in the periodic radio frame is smaller than the length of the second wake up time interval in the periodic radio frame.

7. The communication apparatus as claimed in claim 1, wherein the corresponding paging indicator position in each periodic radio frame indicates a position of a dedicated paging indicator sent from the wireless network for the subscriber identity card to inform of possible transmissions to come.

8. The communication apparatus as claimed in claim 1, wherein the paging period parameter is an integer coefficient for defining the discontinuous reception cycle length adopted between the subscriber identity card and the wireless network, the paging indicator parameter represents an amount of the paging indicators carried by the wireless network in a paging indicator message, and the system frame number is a time varying integer that has been synchronized with the wireless network and is maintained by the controller to represent a current processing frame number.

9. The communication apparatus as claimed in claim 1, wherein the subscriber identity card is an universal subscriber identity module (USIM) card corresponding to an universal mobile telecommunications system (UMTS) and the identity number is an international mobile subscriber identity (IMSI).

10. A method for scheduling a receiving process of a communication apparatus in a communication system, wherein the communication apparatus comprises a hardware radio transceiver module, communicating with a wireless network through a subscriber identity card, a baseband processing module, and a controller coupled to the hardware radio transceiver module, the subscriber identity card and the baseband processing module for controlling the operations therebetween, comprising:
receiving a paging period parameter and a paging indicator parameter from the wireless network via the hardware radio transceiver module;
deactivating the hardware radio transceiver module by the controller;
obtaining a plurality of corresponding system frame numbers of a plurality of periodic radio frames according to the paging period parameter by the controller, wherein the wireless network plans to send a plurality of the paging indicators in a paging indicator message in each periodic radio frame;
dynamically obtaining a first wake up time interval distributed within each periodic radio frame according to the paging indicator parameter, an identity number of the subscriber identity card and the corresponding system frame number of each periodic radio frame by the controller, wherein a length of the first wake up time interval is smaller than a length of a periodic radio frame; and
activating the hardware radio transceiver module to receive a portion of the paging indicators during the first wake up time interval by the controller.

11. The method as claimed in claim 10, further comprising:
obtaining a corresponding paging indicator position for the subscriber identity card in each periodic radio frame according to the paging indicator parameter, the identity number and the corresponding system frame number of each periodic radio frame by the controller,
wherein the corresponding paging indicator position in each periodic radio frame indicates a position of a dedicated paging indicator sent from the wireless network for the subscriber identity card to inform of possible transmissions to come, and wherein the first wake up time interval begins from the corresponding paging indicator position.

12. The method as claimed in claim 10, further comprising:
dynamically obtaining a second wake up time interval distributed within each periodic radio frame according to the first wake up time interval by the controller, wherein the length of the first wake up time interval is smaller than a length of the second wake up time interval, and the length of the second wake up time interval is smaller than the length of a periodic radio frame;
activating the baseband processing module by the controller during the second wake up time interval to receive baseband node-B signals comprising the paging indicators from the hardware radio transceiver module, storing the received baseband node-B signals comprising the paging indicators in a memory device and process the stored paging indicators by the baseband processing module.

13. The method as claimed in claim 12, further comprising:
obtaining a channel estimation result according to the stored baseband node-B signals comprising paging indicators by the baseband processing module after the hardware radio transceiver module is deactivated;
processing the stored baseband node-B signals comprising paging indicators according to the channel estimation result by the baseband processing module to obtain a paging indication result of the subscriber identity card; and
determining whether to activate the hardware radio transceiver module by the controller to receive a following paging message according to the paging indication result.

14. The method as claimed in claim 10, wherein the paging period parameter is an integer coefficient for defining the discontinuous reception cycle length adopted between the subscriber identity card and the wireless network, the paging indicator parameter represents an amount of the paging indicators carried by the wireless network in the paging indicator message, the identity number is an international mobile subscriber identity (IMSI) of the subscriber identity card, and the system frame number is a time varying integer that has been synchronized with the wireless network and is maintained by the controller to represent a current processing frame number of the communication apparatus.

15. The method as claimed in claim 10, wherein the communication system is a wideband code division multiple access (W-CDMA) or a code division multiple access 2000 (CDMA 2000) communication system.

16. A method for scheduling a receiving process of a communication apparatus in a communication system, wherein the communication apparatus comprises a radio transceiver module communicating with a wireless network through a subscriber identity card, a baseband processing module, and a controller coupled to the radio transceiver module, the subscriber identity card and the baseband processing module for controlling the operations therebetween, comprising:

receiving a paging period parameter and a paging indicator parameter from the wireless network via the radio transceiver module;

deactivating the radio transceiver module;

obtaining a plurality of corresponding system frame numbers of a plurality of periodic radio frames according to the paging period parameter, wherein the wireless network plans to send a plurality of the paging indicators in a paging indicator message in each periodic radio frames;

dynamically obtaining a corresponding paging indicator position in each periodic radio frame according to the paging indicator parameter, an identity number of the subscriber identity card and the corresponding system frame number of each periodic radio frame;

obtaining a first wake up time interval distributed within the periodic radio frame according to the corresponding paging indicator position; and activating the radio transceiver module to receive a portion of the paging indicators and activating a baseband processing module to process the received paging indicators during the first wake up time interval when the corresponding paging indicator position is distributed posterior to a predetermined threshold position in the periodic radio frame, wherein a length of the first wake up time interval is smaller than a length of the periodic radio frame.

17. The method as claimed in claim 16, further comprising:

obtaining a channel estimation result according to baseband node-B signals that comprises the paging indicators;

processing one of the received paging indicators with corresponding paging indicator position according to the channel estimation result to obtain a paging indication result; and determining whether to activate the radio transceiver module to receive a following paging message according to the paging indication result.

18. The method as claimed in claim 16, wherein the corresponding paging indicator position in each periodic radio frame indicates a position of a dedicated paging indicator sent from the wireless network for the subscriber identity card to inform possible transmissions to come.

19. The method as claimed in claim 16, wherein the paging period parameter is an integer coefficient for defining the discontinuous reception (DRX) cycle length adopted between the subscriber identity card and the wireless network, the paging indicator parameter represents an amount of the paging indicators carried by the wireless network in the paging indicator message, the identity number is an international mobile subscriber identity (IMSI) of the subscriber identity card, and the system frame number is a time varying integer that has been synchronized with the wireless network and is maintained by the controller to represent a current processing frame number of the communication apparatus.

20. The method as claimed in claim 16, further comprising:

dynamically obtaining a second wake up time interval distributed within the periodic radio frame according to the first wake up time interval when the corresponding paging indicator position is not distributed posterior to a predetermined threshold position in the periodic radio frame;

activating the radio transceiver module from the beginning of the corresponding paging indicator position for the first wake up time interval to receive the portion of the paging indicators; and activating the baseband processing module from the beginning of the corresponding paging indicator position for the second wake up time interval to receive the paging indicators from the radio transceiver module, store the paging indicators in a memory device and process the stored paging indicators, wherein the length of the first wake up time interval is smaller than a length of the second wake up time interval, and the length of the second wake up time interval is smaller than the length of a periodic radio frame.

21. The method as claimed in claim 20, further comprising:

obtaining a channel estimation result according to the stored paging indicators after the radio transceiver module is deactivated;

processing one of the stored paging indicators with corresponding paging indicator position according to the channel estimation result to obtain a paging indication result of the communication apparatus; and determining whether to activate the radio transceiver module to receive a following paging message according to the paging indication result.

* * * * *